March 17, 1970     S. R. PALOWSKY     3,501,167
VEHICLE STABILIZER
Filed Aug. 27, 1968
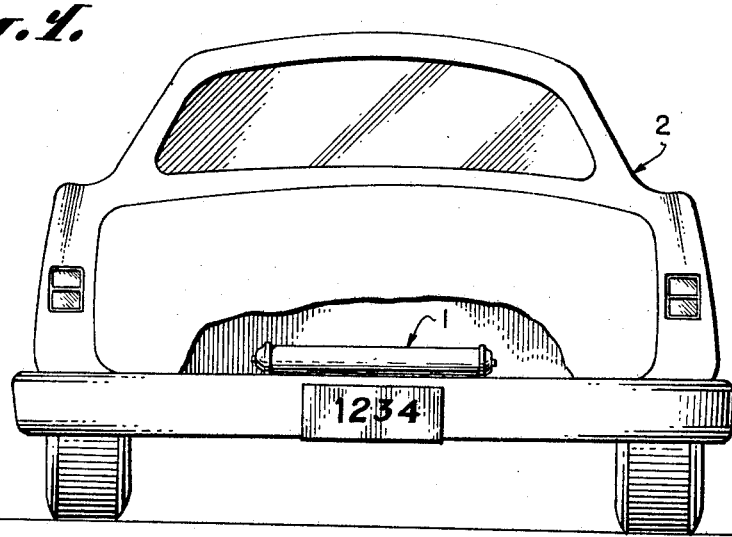
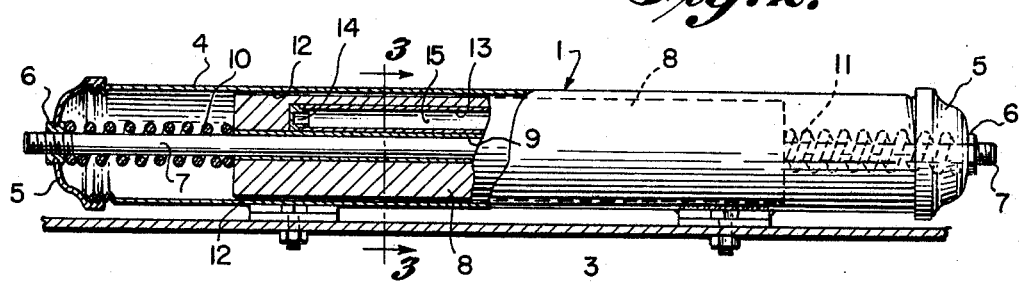
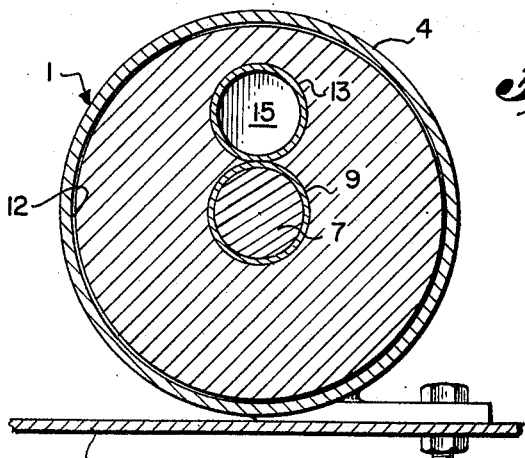
INVENTOR
STANLEY R. PALOWSKY
BY Gardner J. O'Boyle
    James G. O'Boyle
ATTORNEYS

United States Patent Office 3,501,167
Patented Mar. 17, 1970

3,501,167
VEHICLE STABILIZER
Stanley R. Palowsky, Monroe, La., assignor to Gyro-Bar, Inc., North Hollywood, Calif., a corporation of California
Filed Aug. 27, 1968, Ser. No. 755,708
Int. Cl. B60r 27/00; B62d 63/00
U.S. Cl. 280—150                        6 Claims

ABSTRACT OF THE DISCLOSURE

A vehicle stabilizer having an inertia actuated mass which applies a counteracting force in the opposite direction to not only sudden lateral movements of the vehicle but also front-to-rear pitching movements of the vehicle.

BACKGROUND OF THE INVENTION

Various inertia-type stabilizers have been proposed for counteracting vehicle "fishtailing"; that is, the centrifugal skidding or lateral movement of the rear end of a forwardly moving vehicle when its front end is abruptly turned. These stabilizers usually include a housing, mounted parallel to the rear axle of the vehicle, and containing a mass of inertia freely slidable therein but biased toward the medial portion of the housing by a spring positioned at each end of the mass, whereby when a sudden lateral movement of the vehicle occurs the mass will shift within the housing thus compressing one or the other of the springs. The compressed spring then exerts a reactive force which is opposite to the force which causes its compression, thereby stabilizing the vehicle against excessive lateral movement.

While these hitherto employed stabilizers have been satisfactory for their intended purpose, they have been subject to certain disadvantages in that relatively large, heavy weights have been required as the mass of inertia to counteract the "fishtailing" of many of today's larger automobiles. Furthermore, the inertia-type stabilizers used prior to this invention while stabilizing the vehicle to counteract "fishtailing," offered little or no counteraction to the front-to-rear pitching movements of the vehicle, which often accompanies "fishtailing."

After considerable research and experimentation, the stabilizer of the present invention has been devised to overcome the disadvantages experienced in hitherto employed stabilizers, and comprises a cylindrical housing mounted in a substantially horizontal position on the rear end portion of the vehicle and parallel to the rear axle thereof. The cylindrical housing is closed at each end and has a concentrically disposed shaft extending longitudinally therethrough and secured to the ends of the housing. A mass of inertia in the form of a cylindrical weight is slidably and rotatably mounted on the shaft and is axially biased to the medial portion of the housing by a pair of compression springs, each of which is mounted between an end of the housing and a respective end of the weight. A longitudinally extending void is formed in the upper portion of the cylindrical weight on one side of the shaft to thereby position the weight's center of gravity in the lower portion of the weight below the longitudinal axis of the shaft. By positioning the center of gravity of the mass below the longitudinal axis of the shaft, the inertia of the mass is correspondingly displaced from the longitudinal axis of the shaft about which the weight oscillates; thus, the resultant moment of inertia of the weight counteracts the front-to-rear pitching movement of the vehicle, while the resistance to the sliding movement of the weight on the shaft simultaneously counteracts the lateral movement of the vehicle.

This dual counteraction effect is not afforded by prior inertia-type stabilizers; since, in these devices, the center of gravity of the weight extended through the longitudinal axis of the shaft.

In the drawings:

FIGURE 1 is an end elevational view showing the stabilizer of the present invention mounted in operative position on a vehicle;

FIGURE 2 is a fragmentary, sectional, side elevational view of the stabilizer of the present invention; and FIGURE 3 is an enlarged sectional view taken along line 3—3 of FIGURE 2.

Referring in detail to the drawing, the stabilizer 1 of the present invention is mounted in a substantially horizontal position at the rear end of a vehicle 2, behind the rear wheels and parallel to the rear axle. The stabilizer may be conveniently mounted on the vehicle in various ways, as by bolting it to the trunk floor 3, or by attaching it to the vehicle frame by straps, U-bolts, and the like.

The stabilizer comprises a cylindrical housing 4 closed at each end by suitable caps 5, having grommets 6 through which the ends of a shaft 7 are threaded. The inertial mass employed in the stabilizer of the present invention is in the form of a homogeneous, cylindrical weight 8 concentrically mounted on the shaft 7 through a bushing or cylindrical bearing 9 mounted within an axial bore formed in the weight, the bearing facilitating the linear movement of the weight along the longitudinal axis of the shaft, and oscillatory movement thereof about the longitudinal axis of the shaft to be explained more fully hereinafter.

A pair of coil springs 10, 11 concentrically surround the outer end portions of the shaft 7 and are mounted between the ends of the weight and the housing end caps, whereby the weight 8 is normally biased toward the medial portion of the housing as shown in FIGURE 2. A slight clearance 12 is provided between the outer cylindrical surface of the weight and the housing wall to thereby form a bleed groove for the passage of air between the opposite ends of the weight, thereby forming a pneumatic cushion to prevent excessive linear movement of the weight on the shaft.

A longitudinally extending tube 13 is cast within the upper portion of the weight on one side of the shaft, the tube being closed at each end by a plug 14 to thereby form a void or chamber 15. By forming the void in the upper portion of the weight, the center of gravity of the inertial mass becomes located below the longitudinal axis of the shaft. Thus, the inertia of the mass is correspondingly displaced from the longitudinal axis of shaft 7 about which the weight 8 oscillates, whereby the moment of inertia of the weight counteracts the front-to-rear pitching movement of the vehicle.

In the operation of the stabilizer of the present invention, in the event that the vehicle makes a sharp turn and the rear end thereof starts to skid sideways for instance to the left, the weight 8 moves in the opposite direction due to the fact that shaft 7, upon which the weight is slidably mounted, is secured to the housing 4 which in turn is attached to the vehicle. The movement of the weight compresses spring 11 which then exerts a reactive force opposite to the force which causes its compression to thereby stabilize the vehicle against excessive displacement.

Unfortunately, when a vehicle beings to skid, the normal reaction of a majority of drivers is to apply the brakes rather than to turn the wheels toward the direction of the skid. When the brakes are applied, a front-to-rear pitching movement is imparted to the vehicle. This movement is counteracted by the moment of inertia of the mass which has its center of gravity disposed below shaft 7 about which the weight oscillates.

While the operation of the stabilizer of the present invention has been described in connection with skidding or "fishtailing," and front-to-rear pitching movement, it will be appreciated by those skilled in the art that the stabilizer of the present invention also offsets side swaying and pitching imparted to the vehicle when passing over the even roads.

What is claimed is:

1. A vehicle stabilizer of the character described comprising, a housing adapted to be mounted on a vehicle in a transverse position at substantially right angles to the longitudinal axis of said vehicle, a shaft mounted in said housing and coincident therewith, an inertial mass, means slidably and rotatably mounting said mass on said shaft within said housing, spring means mounted within said housing and arranged to resist axial movement of said mass in either direction on said shaft, and means formed in said mass to offset the center of gravity of said mass from the longitudinal axis of said shaft, whereby the moment of inertia of said mass resists rotary movement of said mass relative to said shaft.

2. A vehicle stabilizer according to claim 1 wherein said housing comprises a cylinder having caps closing each end thereof, the opposite ends of said shaft being secured to said caps, and said intertial mass comprising a cylindrical weight having a length less than the distance between said caps.

3. A vehicle stabilizer according to claim 2 wherein the means for slidably and rotatably mounting the weight on the shaft comprises a cylindrical bearing mounted within an axial bore formed in the cylindrical weight.

4. A vehicle stabilizer according to claim 2, wherein said spring means comprises, a pair of coil springs, each spring being positioned within the housing and biased between an end of the cylindrical weight and a respective cap on the housing.

5. A vehicle stabilizer according to claim 2, wherein the means formed in said mass to offset its center of gravity comprises, a void chamber formed in said cylindrical weight on one side of said shaft.

6. A vehicle stabilizer according to claim 5, wherein the chamber is formed by a longitudinally extending tube mounted within the weight and closed at each end thereof.

References Cited
UNITED STATES PATENTS

| | | | |
|---|---|---|---|
| 2,545,578 | 3/1951 | Hanel | 280—150 |
| 2,635,898 | 4/1953 | Silverman | 280—150 |

LEO FRIAGLIA, Primary Examiner

R. R. SONG, Assistant Examiner